United States Patent
Massaro et al.

(10) Patent No.: US 7,426,695 B1
(45) Date of Patent: Sep. 16, 2008

(54) METHOD AND APPARATUS FOR COORDINATING DISPLAY ELEMENTS WITH THE STRUCTURE OF A COMPUTER SYSTEM

(75) Inventors: Kevin L. Massaro, Houston, TX (US); Stacy L. Wolff, Cypress, TX (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 1577 days.

(21) Appl. No.: 09/594,308

(22) Filed: Jun. 15, 2000

(51) Int. Cl.
*G06F 3/048* (2006.01)
*G06F 3/00* (2006.01)

(52) U.S. Cl. ............... 715/765; 715/745; 715/747

(58) Field of Classification Search ............. 345/333, 345/765, 334, 744, 764; 361/683; 364/551.01; 395/349; 705/36, 27; 365/173–175; 715/765, 715/745, 747

See application file for complete search history.

(56) References Cited

U.S. PATENT DOCUMENTS

| | | | |
|---|---|---|---|
| 5,162,783 A * | 11/1992 | Moreno | 345/175 |
| 5,225,293 A | 7/1993 | Mitchell et al. | |
| 5,397,176 A | 3/1995 | Allen et al. | |
| 5,432,715 A * | 7/1995 | Shigematsu et al. | 702/188 |
| 5,491,611 A | 2/1996 | Stewart et al. | |
| 5,602,997 A * | 2/1997 | Carpenter et al. | 24/669 |
| 5,653,518 A | 8/1997 | Hardt | |
| 5,870,282 A * | 2/1999 | Andre et al. | 361/683 |
| 5,886,687 A * | 3/1999 | Gibson | 345/173 |
| 5,905,492 A * | 5/1999 | Straub et al. | 345/744 |
| 5,959,624 A * | 9/1999 | Johnston et al. | 345/746 |
| 6,188,399 B1 * | 2/2001 | Voas et al. | 345/723 |
| 6,392,671 B1 * | 5/2002 | Glaser | 345/765 |
| 6,492,978 B1 * | 12/2002 | Selig et al. | 345/173 |

OTHER PUBLICATIONS

Jacquelyn Gavron and Joseph Moran, How to use Microsoft Windows NT 4 Workstation, ZD Press Publisher, Vision 4, 1996.*
Chris Hughes, Lori Kern, and Brad Phillips, Using Microsoft Plus, Que Publisher, 1995.*
Screen Dump, Bilkent University, http://www.bilkent.edu.tr/graduate/bilkentpictures/libcom.html, Screen Dump No. 1-3, Screen Dump No. 3 in 1999.*
PC Magazine, Jun. 11, 1996, vol. 15 No. 11, figures 1-5).*

* cited by examiner

*Primary Examiner*—Weilun Lo
*Assistant Examiner*—Truc T Chuong

(57) ABSTRACT

A system and method are provided that enable a computer user to match a computer display wallpaper design to interchangeable components of a computing system. Multiple, interchangeable panels or sets of matching panels are installed on components of the computing system and a matching wallpaper is displayed on the video display. Files storing the wallpaper designs are stored on a computer-readable medium. In addition, the system and method provide logic to detect a particular panel or set of panels and retrieve the corresponding wallpaper from the computer-readable medium and display it on the video display.

22 Claims, 6 Drawing Sheets

METHOD AND APPARATUS FOR COORDINATING DISPLAY ELEMENTS WITH THE STRUCTURE OF A COMPUTER SYSTEM

BACKGROUND OF THE INVENTION

1. Field of the Invention

The present invention generally relates to a business method for configuring a computer screen such that the screen displays a pattern that is complementary to the design of various components of a computing system.

2. Description of the Related Art

Computer display screens originally were black and white, character-based and were based upon the technology of cathode-ray tubes (CRTs). The early CRTs suffered from a number of problems, most notably burn-out. As a result, "screen saver" programs were developed to black-out the screen after a fixed period of inactivity, thus preventing spots on the computer screen from burning out. As computer display screens moved from character-based to graphic-based, screen saver programs changed as well. Instead of blacking out the screen, the screen saver programs displayed a repetitive pattern that also prevented any one spot in screen from suffering from burn-out. The advent of graphics displays also opened the way for graphical user interfaces (GUIs) such as Windows published by the Microsoft Corporation of Redmond, Wash. Like screen savers, GUIs began to offer computer users a number of possible customizations for their computer displays. Icons can be moved or changed, menu items can be added and removed from the display and the background, or "wallpaper," of the display can be customized from a wide selection of patterns and colors. While all this customization became possible in the computer display, the computer cases themselves changed very little.

Traditionally, electronic devices have been produced only in black or shades of gray. Recently, consumers have demanded more choices in both the colors and design schemes of their electronic devices. Certain devices offer fronts, or "panels," that change the look and/or color of components.

SUMMARY OF THE INVENTION

A system and method are provided that enable a computer user to match a computer display wallpaper and/or screen saver design to components of a computing system. The computing system provides multiple, interchangeable panels or sets of matching panels that can be installed on components of the computing system such as a central processing unit (CPU) and a video display. Each set of panels is decorated with a particular design that includes elements such as a color and a pattern. Also provided is a matching pattern, or "wallpaper," corresponding to each particular panel design. Each wallpaper or screen saver is stored on a computer readable medium such as a hard disk or a floppy disk and is employed by a processor or graphics card to generate a design on a video display of the computing system that is complementary to the corresponding panel or set of panels. In addition, the system and method provide logic to detect a particular panel or set of panels and retrieve and display the corresponding wallpaper or screen saver on the video display.

A method of business is also provided. In a retail sales or industry conference situation, computers are displayed in groups, each computer one of a plurality of colors and patterns. In addition, the wallpaper and/or screen saver displayed on each computer are coordinated such that the colors and patterns create an integrated design scheme.

BRIEF DESCRIPTION OF THE FIGURES

A better understanding of the present invention can be obtained when the following detailed description of the invention is considered in conjunction with the following figures, in which.

DETAILED DESCRIPTION OF THE PREFERRED EMBODIMENT

This application is related to the following co-pending, concurrently filed, and commonly assigned United States patent application which is hereby incorporated by reference:

U.S. patent application Ser. No. 09/594,308, entitled "Readily Attachable and Removable Faceplates for a Computer Housing."

Figure 1:
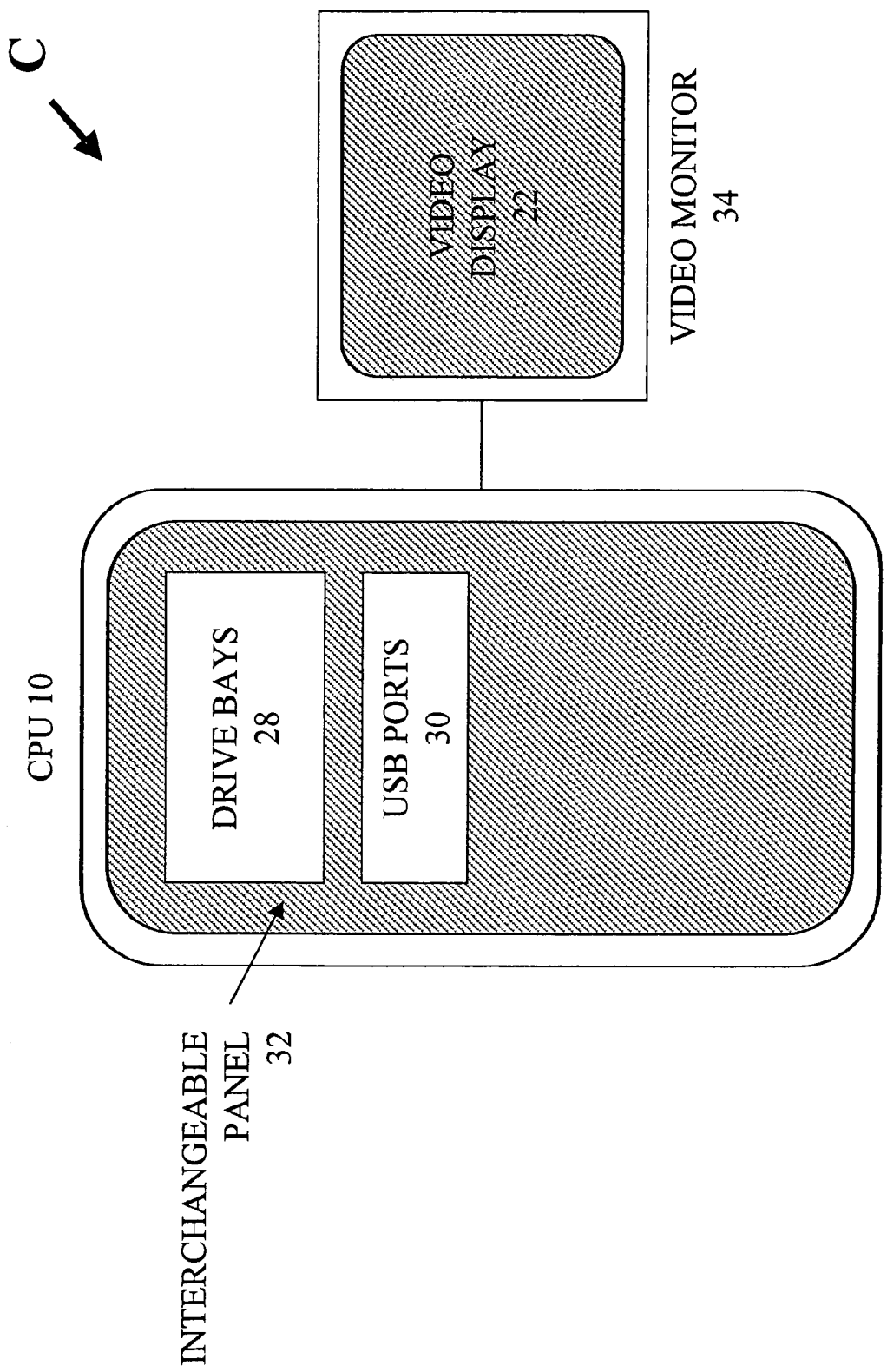
FIG. 1 illustrates a computing system with interchangeable panels.

FIG. 1 illustrates a computing system C with an interchangeable panel 32. The computing system C includes a central processing unit (CPU) 10 and a video monitor 34. Typically, computing systems include additional components such as a modem, a keyboard and a mouse; but, here, these additional components are omitted for the sake of clarity. The CPU 10 includes drive bays 28, which may contain components such as a hard disk drive or a floppy disk drive. Also included in the CPU 10 are universal serial bus (USB) ports 30. The drive bays 28 and the USB ports 30 are not critical to the spirit of the invention but are instead included as examples of components that may be present on the face of the CPU 10. Other components that may be included on the face of the CPU 10 are On/Off and reset buttons. The interchangeable panel 32 is a removable faceplate that can be swapped with another similar shaped panel, enabling a user of the computing system C to change the look and/or color of the computing system C. The interchangeable panel 32 is described in more detail in the patent entitled "Readily Attachable and Removable Faceplates for a Computer Housing," previously incorporated by reference. In an alternative embodiment, an interchangeable panel can be a part of the video monitor 34 that surrounds the video display 22. The interchangeable video display panel can also be implemented with the techniques of the disclosed embodiment.

The video monitor includes a video display 22, which displays a particular pattern, or "wallpaper" as a background. The video display 22 typically displays characters and images superimposed upon the wallpaper. The techniques of the disclosed embodiment can also be implemented in a pattern and/or colors of a screen saver rather than, or in addition to, the wallpaper. The choice of wallpaper or screen saver, which can include patterns and one or more colors, can be preconfigured, selected by the computer user or configured by the computing system C based upon the interchangeable panel 32. In the disclosed embodiment, the interchangeable panel 32 has a pattern and/or color that matches the wallpaper displayed in the video display 22. The patterns and/or colors of the interchangeable panel 32 and the video display 22 may also be selected to compliment rather than match each other. In an alternative embodiment, the computing system C detects a particular interchangeable panel 32 and configures the matching video display 22 without human intervention.

Figure 2:
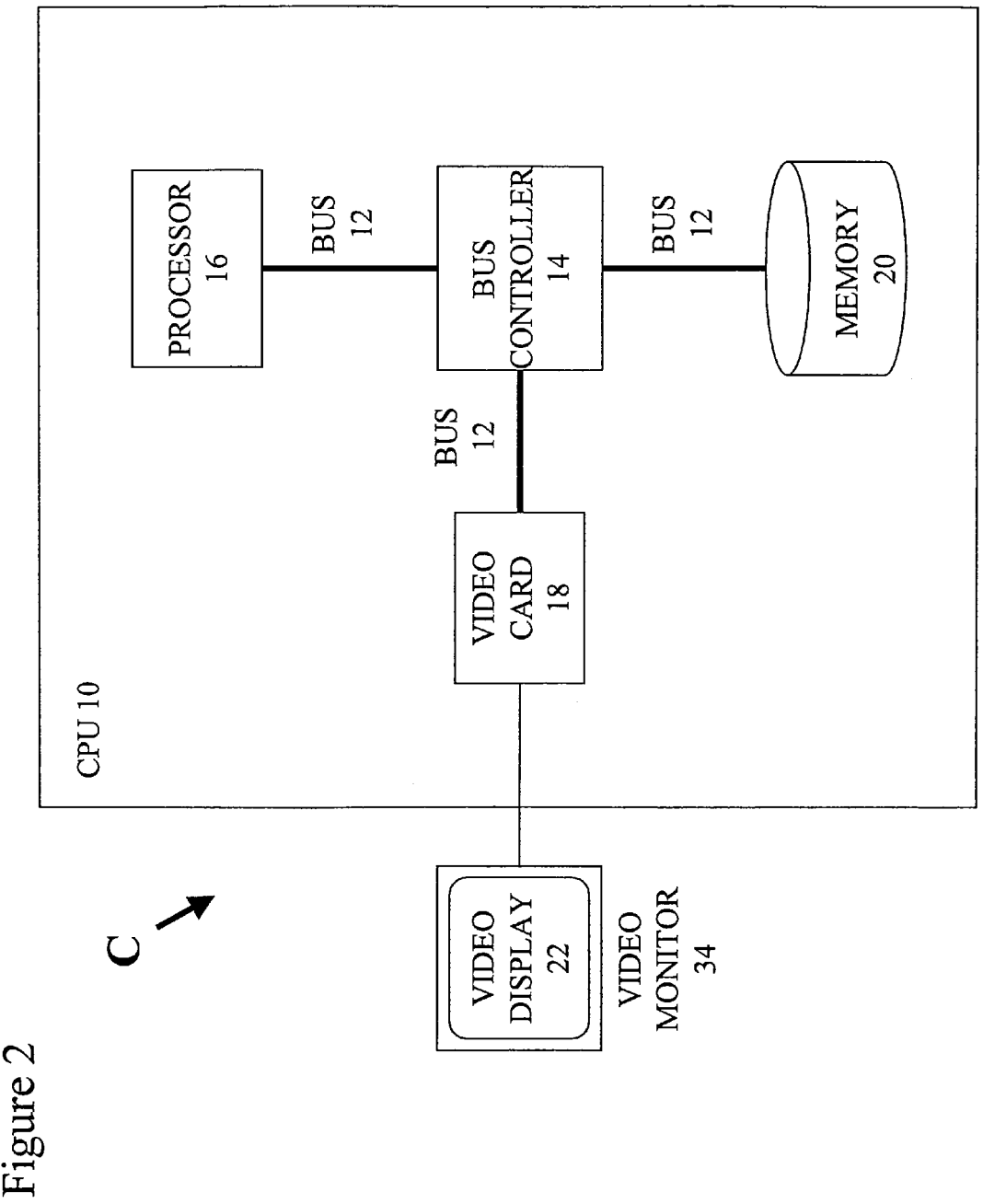
FIG. 2 is a block diagram of a computing system that can implement the techniques of the disclosed embodiment.

FIG. 2 illustrates a block diagram of computing system C in which some internal components of the CPU 10 are shown in more detail. The CPU 10 includes a bus 12, a bus controller 14, a processor 16, a video card 18 and a memory device 20. One with skill in the computing arts is familiar with the relationship and function of components 12, 14, 16, 18 and 20. The video display 22, which corresponds to a particular interchangeable panel 32, is stored in the memory 20 and transmitted to the video monitor 34 by either the processor 16 or the video card 18. The specific makes, models, manufacturers and specifications of the components 12, 14, 16, 18, and 20 are not critical to the spirit of the invention but are used for explanatory purposes only. In addition, the computing system C can contain additional or fewer components and is not drawn to scale.

Figure 3:
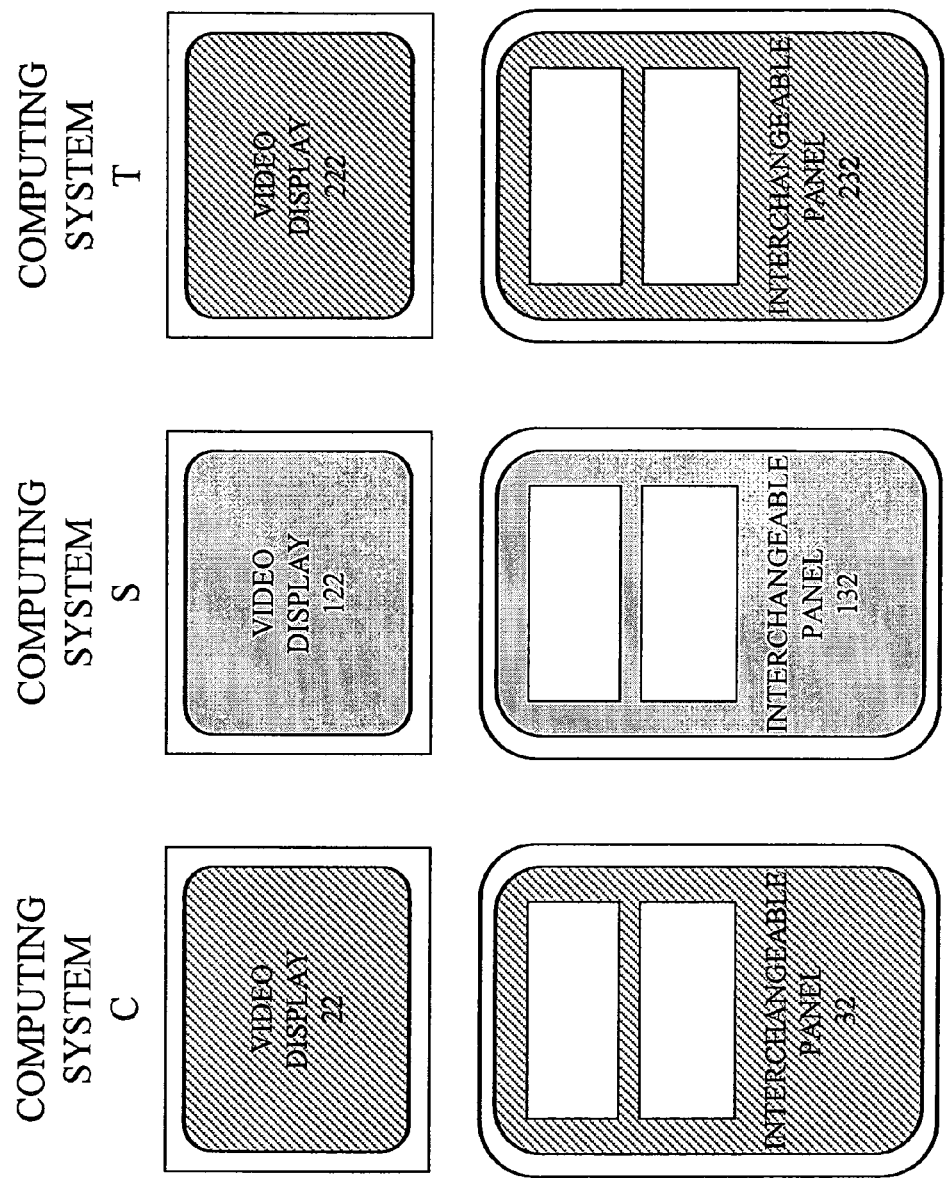
FIG. 3 illustrates three computing systems grouped together in a retail display.

FIG. 3 illustrates a grouping of computing systems, the computing system C, a computing system S and a computing system T. Computing systems C, S and T are show arranged in the form of a retail display. The video display 22 and the interchangeable panel 32 are configured with matching patterns and/or colors; a video display 122 and an interchangeable panel 132 of computing system S are configured with matching patterns and/or colors; and a video display 222 and an interchangeable panel 232 of computing system T are configured with matching patterns and/or colors. The techniques of the disclosed embodiment enable many patterns to be created within various groupings of computers. For example, the video displays 22, 122 and 222 can all match each as well as the interchangeable panels 32, 132 and 232. Another display scheme might be such that the video display 122 matches the interchangeable panels 32 and 232, while the video displays 22 and 222 match the interchangeable panel 132. In addition, patterns and/or colors can be chosen based on visual considerations in addition to colors that match. Thus, purchasers or conference attendees see various patterns and/or colors of computers forming an integrated, overall design scheme.

Figure 4:
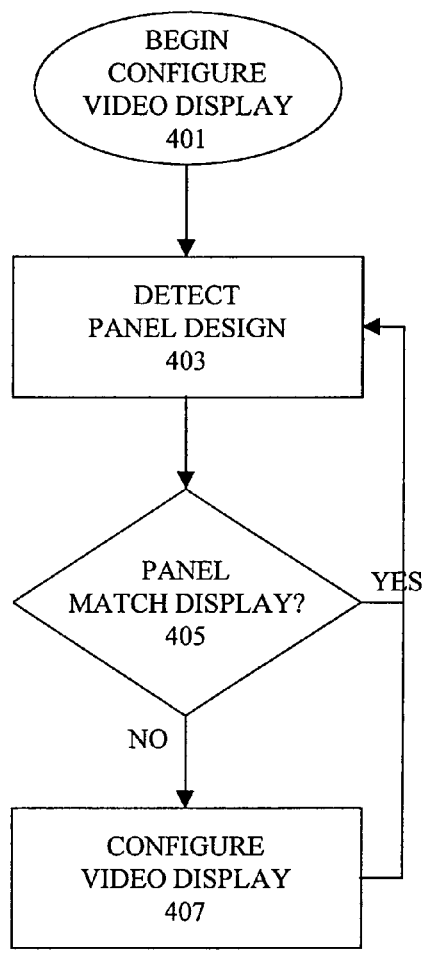
FIG. 4 is a flowchart illustrating a process that implements one of the techniques of the disclosed embodiment.

FIG. 4 is a flowchart illustrating an automatic display configuration process 400. The process 400 starts in a "Begin Configure Video Display" step 401 and control proceeds immediately to a "Detect Panel Design" step 403, in which the processor 16 of computing system C (FIG. 2), for example upon receipt of an interrupt, determines the current interchangeable panel 32 installed upon the CPU 10. Many computer systems are able to detect specific configuration parameters, and one with skill in the art would know how to design the computing system C and the interchangeable panel 32 such that the computing system C could distinguish the pattern of the interchangeable panel 32.

Once the particular pattern and/or color of the panel 32 is know to the computing system 10, control proceeds to a "Panel Match Display?" step 405 in which the processor 16 compares the pattern and/or color of the interchangeable panel 32 detected in step 403 with a pattern and/or color currently configured to be displayed on the video display 22 (FIG. 2). If the interchangeable panel 32 and the video display 22 match, then control proceeds to step 403 and the process begins over again, perhaps after an interval of time has passed. If the interchangeable panel 32 and the video display do not match, then control proceeds to a "Configure Video Display" step 407. In step 407, the processor retrieves a file containing video display 22 configuration data from the memory 20 and passes it to the video card 18 for display on the video display 22. Control then proceeds to step 401 and the process 400 begins over again, perhaps after waiting the interval of time. In an alternative embodiment, the video card 18 is designed to handle the detection and file retrieval logic instead of the processor 16.

Figure 5:
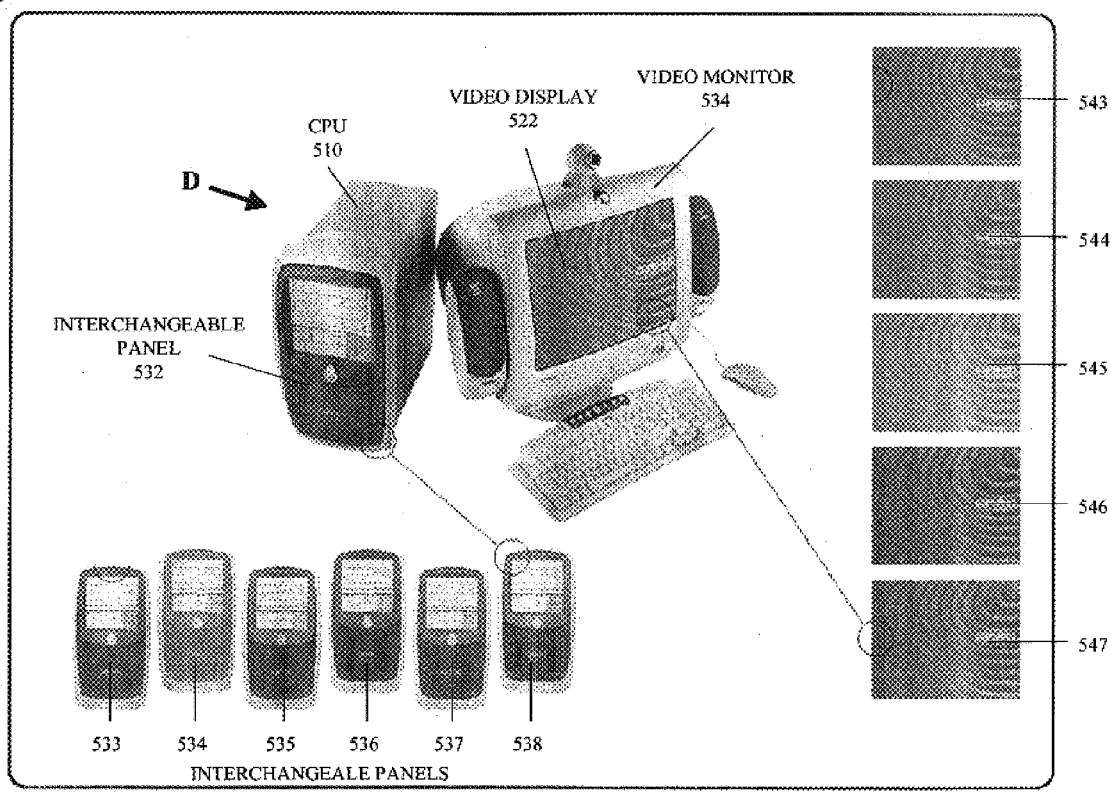
FIGS. 5 and 6 are illustrations of a computing system incorporating the disclosed embodiment as it has been actually implemented.

FIG. 5 is an illustration of a computing system D that incorporates the techniques of the disclosed embodiment as it is actually implemented. The computing system D includes a CPU 510 and a video monitor 534. An interchangeable panel 532 is attached to the CPU 510. Additional interchangeable panels 533, 534, 535, 536, 537 and 538 and exemplary patterns and/or colors 543, 544, 545, 546, and 547 are also shown. In this example, the video display 522 is configured with the pattern and/or color 547 which complements, but does not match the interchangeable panel 532 attached to the CPU 510. The interchangeable panel 533 matches the pattern and/or color 543; interchangeable panel 534 matches the pattern and/or color 544; and so on. In this illustration, there is no illustrated matching pattern and/or color for interchangeable panels 532 and 538.

Figure 6:
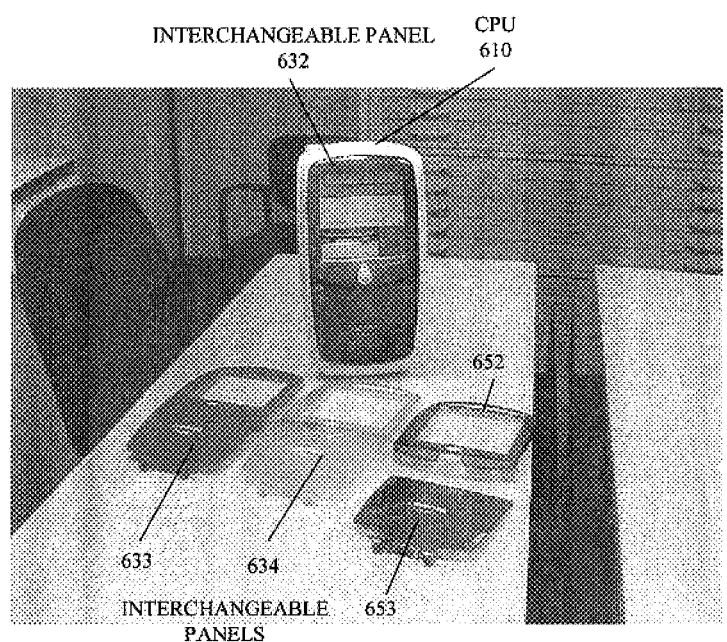

FIG. 6 is an illustration of a CPU 610 that is an actual implementation of the techniques of the disclosed embodiment. An interchangeable panel 632 is attached to the CPU 632. Additional interchangeable panels 633 and 634 are also shown. As can be seen from two panel sections 652 and 653, the interchangeable panels 632, 633 and 634 are actually made up of two pieces that attach separately to the CPU 610.

The foregoing disclosure and description of the various embodiments are illustrative and explanatory thereof, and various changes in the descriptions and attributes of the steps, processes, the organization of the steps, and the order and timing of steps taken, as well as in the details of the illustrated systems and video displays may be made without departing from the spirit of the invention. It shall be understood that a system according to the described techniques can be implemented in a variety of processor-based systems.

We claim:

1. A method of displaying computers, comprising:
providing a plurality of computers, each with a video display design and having an interchangeable panel chosen from a plurality of panels installed on a housing, the plurality of panels each having a distinct visual design scheme;
correlating the distinct visual design schemes of the plurality of interchangeable panels and the video display designs of the plurality of computers such that they create an integrated design scheme; and
displaying the plurality of computers in the same place; so that the integrated design scheme is observable by individuals.

2. The method of claim 1, wherein each video display design is implemented in a video display wallpaper.

3. The method of claim 1, wherein each video display design is implemented in a screen saver.

4. The method of claim 1, wherein each of the interchangeable panels is placed on an associated one of the plurality of computers during its manufacture and video display design is configured to correspond with the distinct visual design scheme for each of the plurality of computers.

5. The method of claim 1, wherein the video display design of each of the plurality of computers matches the corresponding distinct visual design scheme.

6. The method of claim 1, wherein the individuals are customers.

7. The method of claim 1, wherein the individuals are conference attendees.

8. A method of configuring a computing device, comprising:
- selecting a first panel from a plurality of panels, each of the plurality of panels having a distinct visual design scheme, for interchangeable installation on a computing system;
- configuring a display design scheme corresponding to the distinct visual design scheme of the first panel; and
- displaying the display design scheme on a display device coupled to a central processing unit (CPU) of the computing system.

9. The method of claim 8, further comprising:
- storing on a computer readable medium associated with the computing device a display design scheme based upon the distinct visual design scheme of the first panel.

10. The method of claim 8, wherein each display design scheme is based upon a corresponding distinct pattern selected from a plurality of distinct patterns, each of the plurality of distinct patterns corresponding to one of the distinct visual design schemes of the plurality of panels.

11. The method of claim 8, wherein the display design scheme is color-coordinated with the distinct visual design scheme of the first panel.

12. The method of claim 8, further comprising:
- detecting the distinct visual design scheme of the first panel after the installation of the first panel; and
correlating the display design scheme to the distinct visual design scheme of the first panel based upon the detected distinct visual design scheme of the first panel prior to reading the display design scheme from a computer readable medium.

13. The method of claim 8, wherein the software display design scheme is implemented in a display wallpaper.

14. The method of claim 8, wherein the software display-design scheme is implemented in a screen saver.

15. The method of claim 8, wherein the display device comprises a bezel, the bezel having a design that corresponds to the distinct visual design scheme of the first panel.

16. A computing system, comprising:
- a central processing unit (CPU);
- a video display coupled to the CPU;
- a computer readable media;
- a selected one of a plurality of panels, each of the plurality of panels having a distinct visual design scheme, the selected one of the plurality of panels being interchangeably installed on the computing system;
- a selected one of a plurality of video display designs stored on the computer readable media, each video display design corresponding to one of the distinct visual design schemes; and
- logic for displaying on the video display the video display design corresponding to the selected one of the plurality of panels.

17. The computing system of claim 16, wherein the plurality of video display designs includes one or more wallpaper designs.

18. The computing system of claim 16, wherein the plurality of video display designs includes one or more screen saver designs.

19. The computing system of claim 16, wherein the selected one of the plurality of video display designs matches the distinct visual display scheme of the selected one of the plurality of panels.

20. The computing system of claim 16, wherein the selected one of the plurality of video display designs is color-coordinated with the distinct visual display scheme of the selected one of the plurality of panels.

21. The computing system of claim 16, further comprising:
- logic for detecting the selected one of the plurality of panels;
- logic for retrieving the corresponding video display design from the computer-readable medium; and
- logic for displaying the retrieved video display design on the video display.

22. The computing system of claim 16, comprising a display device having a bezel, the bezel having a design that corresponds to the distinct visual design scheme of the selected one of the plurality of panels.

* * * * *

UNITED STATES PATENT AND TRADEMARK OFFICE
CERTIFICATE OF CORRECTION

PATENT NO. : 7,426,695 B1 Page 1 of 1
APPLICATION NO. : 09/594308
DATED : September 16, 2008
INVENTOR(S) : Kevin L. Massaro et al.

It is certified that error appears in the above-identified patent and that said Letters Patent is hereby corrected as shown below:

In column 5, lines 41-42, in Claim 14, delete "display-design" and insert
-- display design --, therefor.

Signed and Sealed this

Twentieth Day of January, 2009

JON W. DUDAS
*Director of the United States Patent and Trademark Office*